United States Patent
Cabaret et al.

(10) Patent No.: US 8,020,113 B2
(45) Date of Patent: Sep. 13, 2011

(54) METHOD AND SYSTEM FOR SYNCHRONIZING A DISPLAY CONTEXT

(75) Inventors: Remi Cabaret, Toulouse (FR); Laurent Georges, Pinsaguel (FR); Mathieu Cornillon, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 610 days.

(21) Appl. No.: 12/193,435

(22) Filed: Aug. 18, 2008

(65) Prior Publication Data

US 2009/0055767 A1    Feb. 26, 2009

(30) Foreign Application Priority Data

Aug. 20, 2007   (FR) ...................................... 07 05906

(51) Int. Cl.
*G06F 3/048* (2006.01)
(52) U.S. Cl. .............. 715/771; 715/737; 701/3; 701/14; 340/945; 340/971
(58) Field of Classification Search .................. 715/771, 715/737; 345/1.1, 1.2, 1.3; 701/3, 14; 340/945, 340/971
See application file for complete search history.

(56) References Cited

U.S. PATENT DOCUMENTS

| | | | | |
|---|---|---|---|---|
| 4,001,807 A * | 1/1977 | Dallimonti | ...................... | 700/84 |
| 4,845,495 A * | 7/1989 | Bollard et al. | ................ | 340/973 |
| 5,475,594 A * | 12/1995 | Oder et al. | ..................... | 701/14 |
| 6,112,141 A * | 8/2000 | Briffe et al. | ..................... | 701/14 |
| 6,314,343 B1 * | 11/2001 | Adams et al. | ..................... | 701/3 |
| 6,466,235 B1 * | 10/2002 | Smith et al. | ..................... | 701/14 |
| 6,614,419 B1 * | 9/2003 | May | .............................. | 345/156 |
| 6,859,688 B1 | 2/2005 | Orf | | |
| 6,952,630 B2 * | 10/2005 | Hedrick | ............................. | 701/3 |
| 6,995,690 B1 * | 2/2006 | Chen et al. | .................... | 340/974 |
| 7,191,406 B1 | 3/2007 | Barber | | |
| 7,268,702 B2 * | 9/2007 | Chamas et al. | ............... | 340/975 |
| 7,363,521 B1 * | 4/2008 | Mehan | ......................... | 713/300 |
| 7,516,052 B2 * | 4/2009 | Hatcherson et al. | ............. | 703/6 |
| 7,626,515 B1 * | 12/2009 | Langner et al. | ............... | 340/971 |
| 7,724,259 B2 * | 5/2010 | Hedrick et al. | ................ | 345/501 |
| 2003/0132860 A1 * | 7/2003 | Feyereisen et al. | ........... | 340/973 |
| 2004/0059472 A1 * | 3/2004 | Hedrick | ............................ | 701/3 |
| 2004/0059474 A1 * | 3/2004 | Boorman et al. | ................ | 701/14 |
| 2004/0162648 A1 | 8/2004 | Bontrager | | |
| 2005/0253774 A1 | 11/2005 | Choi | | |
| 2008/0001847 A1 * | 1/2008 | Kratchounova et al. | ....... | 345/1.1 |
| 2008/0184166 A1 * | 7/2008 | Getson et al. | ................. | 715/810 |

OTHER PUBLICATIONS

Preliminary Search Report dated Mar. 27, 2008 w/ English translation.

* cited by examiner

*Primary Examiner* — Weilun Lo
*Assistant Examiner* — Rashedul Hassan
(74) *Attorney, Agent, or Firm* — Dickinson Wright PLLC

(57) ABSTRACT

A display system automatically presents a format in accordance with a prerecorded display configuration, upon a change of format on a screen of the display system.

8 Claims, 2 Drawing Sheets

METHOD AND SYSTEM FOR SYNCHRONIZING A DISPLAY CONTEXT

BACKGROUND OF THE INVENTION AND DESCRIPTION OF THE PRIOR ART

The present invention relates to a method for display context synchronization for a display system of an aircraft, as well as to a display system with synchronized display context.

The present invention applies to a display system exhibiting a distributed architecture and comprising a plurality of units, each of said units comprising:
- a viewing screen able to display one of a plurality of different formats; and
- a control panel comprising actuation means allowing an operator to control the display on the viewing screen of one of said formats so as to present it in accordance with a particular display context which represents a display configuration. Said display context defines a set of particular options (scale, mode of display, type of symbology, etc.) which can be selected by the pilot via means of actuation of the control panel for the associated format.

When said display system is intended for a transport airplane, in particular a military transport airplane, a significant number of formats (or display formats) are accessible for selection on the flight deck of this airplane. A format illustrates the set of display data which form part of one and the same flight function such as short-term piloting, navigation or management of tactical systems for example. On a tactical transport airplane, a display system can comprise at least some of the following formats:
- a PFD ("Primary Flight Display") format which displays primary flight parameters;
- an NTD format which illustrates a tactical navigation format;
- an EWD ("Engine Warning Display") format which corresponds to a format for monitoring engine parameters and for optionally generating alerts;
- an SD ("System Display") format which corresponds to a format illustrating the statuses of systems of the airplane;
- a video format which represents a format displaying images taken by cameras of the airplane;
- an FM ("Flight Management") format;
- a TM format for managing tactical systems of the airplane;
- an AD format for managing in-flight drop phases; and
- a FUEL format for managing in-flight refueling phases.

In order to ensure high operational effectiveness, each pilot is generally free to display the formats that he wishes, at any moment, on the viewing screens allocated thereto, using the associated control panels for this purpose. He can also freely configure their display context, in particular according to the flight phases.

Thus, during a flight containing several different tactical missions (drop, refueling, low-altitude flight, overflying of a hostile zone, etc.), the pilot of a military transport airplane will freely choose the format to be displayed on each viewing screen allocated thereto, so as to adapt it to his mission. For this purpose, the pilot may have in particular:
- to swap the formats on two different screens; and
- to redisplay a previously displayed format (for example following a fault with another screen or in the event of managing a new flight situation).

Consequently, such a display system of aforesaid type is particularly well suited to a military transport airplane since, by virtue of the aforesaid freedom of format selection, it allows the pilot to adapt the information presented by this display system to his mission. Moreover, certain formats permit a very large number of different configurations, thereby making it possible to respond effectively to the requirements of different missions.

However, such a display system exhibits a significant drawback. It gives rise to a significant workload for the pilot or pilots of the airplane, which workload is not always compatible with the demands (flight management, monitoring of the environment of the airplane, etc.) of a tactical mission such as aforesaid.

Furthermore, as the display system considered in the present invention exhibits a distributed architecture, that is to say an architecture where each unit is independent of the other units and therefore does not comprise any data concentrator or master computer (or unit) which coordinates the action of the other units, it is not possible to provide a central facility for managing the display contexts so as to reduce this workload.

SUMMARY OF THE INVENTION

The present invention relates to a method for display context synchronization for a display system of an aircraft, in particular of a military transport airplane, which makes it possible to remedy the aforesaid drawbacks.

For this purpose, according to the invention, said method for display context synchronization for a display system of the type exhibiting a distributed architecture and comprising a plurality of units, each of said units comprising:
- a viewing screen able to display one of a plurality of different formats; and
- a control panel comprising actuation means allowing an operator to control the display on the viewing screen of one of said formats so as to present it in accordance with a particular display context which represents a display configuration, said display context defining a set of particular options which have been selected for the associated format, is noteworthy in that:
- for each unit, a display configuration is automatically recorded in a memory forming part of this unit, for each of the formats able to be displayed by this unit;
- the following are recorded in the memory of a unit, as display configurations:
  - for the format which is currently displayed by this unit, the display configuration such as displayed; and
  - for each of the other possible formats, the corresponding display configuration which has been displayed last for this format on all of the other units and, by default, a default display configuration; and
- when the display of a new format is requested by an operator via the control panel on a particular unit, the recorded display configuration which is associated with this new requested format is automatically extracted from the memory of this unit and this new format is displayed in accordance with said associated display configuration thus extracted.

Thus, by virtue of the invention, upon a change of format on a viewing screen of one of the units of the display system, this format is presented automatically in accordance with a prerecorded display configuration. This prerecorded display configuration corresponds, according to the invention, either to the display configuration displayed on the viewing screen concerned (for the current format), or (for the other formats) to the display configuration displayed last on one of the other screens of said display system.

The present invention therefore achieves a backup function (and display configuration restore function) which makes it possible to substantially decrease the workload of the crew, this being particularly advantageous during tactical operations for which the crew must remain concentrated on the flight and on the environment of the aircraft.

Advantageously, when a new format is displayed in accordance with an associated display configuration on a unit, the control panel of this unit is synchronized with this new display configuration so that the control panel is consistent with the display carried out on the associated viewing screen.

Said display system is intended for a single pilot of the aircraft. So, in the case where the aircraft is piloted by two pilots, a controlling pilot and a copilot, it comprises a display set comprising two display systems of the aforesaid type, one of which is intended for the controlling pilot and is arranged on his side, and the other of which is intended for the copilot and is arranged on the latter's side.

In a particular embodiment, when on a unit of said display system, the display is requested of a new format which corresponds to a format already displayed on another unit of said display system, this new display is not carried out.

However, in a particular variant of this particular embodiment, when on a unit of said display system, the display is requested of a new format which corresponds to a format already displayed on another unit of said display system, a swap of the display formats is carried out between these two units.

Additionally, in an advantageous manner, upon booting of a unit, the following are recorded in the memory of this unit, as display configurations:
- if one of the other units of said display system is not in the booting phase and if, moreover, the communications are refreshed, all the display configurations such as recorded in the memory of this other unit; and
- otherwise, default display configurations.

The present invention also relates to a display system of an aircraft, in particular of a military transport airplane, with synchronized display context.

For this purpose, said display system of the type exhibiting a distributed architecture and comprising a plurality of units, each of said units comprising:
- a viewing screen able to display one of a plurality of different formats; and
- a control panel comprising actuation means allowing an operator to control the display on the viewing screen of one of said formats so as to present it in accordance with a particular display context which represents a display configuration, said display context defining a set of particular options which have been selected for the associated format, is noteworthy, according to the invention, in that:
  each of said units comprises moreover:
    recording means for automatically recording a display configuration
    in a memory of said unit, for each of the formats able to be displayed by this unit, said recording means being formed so as to record in said memory, as display configurations:
      for the format which is currently displayed by this unit, the display configuration such as displayed; and
      for each of the other possible formats, the corresponding display configuration which has been displayed last for this format on the set formed on all of the other units and, by default, a default display configuration;
    first means for automatically extracting from said memory the display configuration which is associated with a new format, when the display of this new format is requested by an operator via the control panel of this unit;
    second means for displaying this new format on the associated viewing screen in accordance with said display configuration thus extracted; and
    a data transmission link which connects said control panel at least to said recording means; and
  said display system comprises, moreover, a data transmission network which interconnects the recording means of the various units of said display system.

In a particular embodiment, each of said units comprises, moreover, synchronization means for automatically synchronizing the control panel of the corresponding unit, with a display configuration in accordance with which a new format is displayed.

The present invention also relates to an aircraft which comprises a display system such as aforesaid.

BRIEF DESCRIPTION OF THE DRAWINGS

The figures of the appended drawing will elucidate the manner in which the invention may be embodied. In these figures, identical references designate similar elements.

DESCRIPTION OF THE PREFERRED EMBODIMENTS

Figure 1:
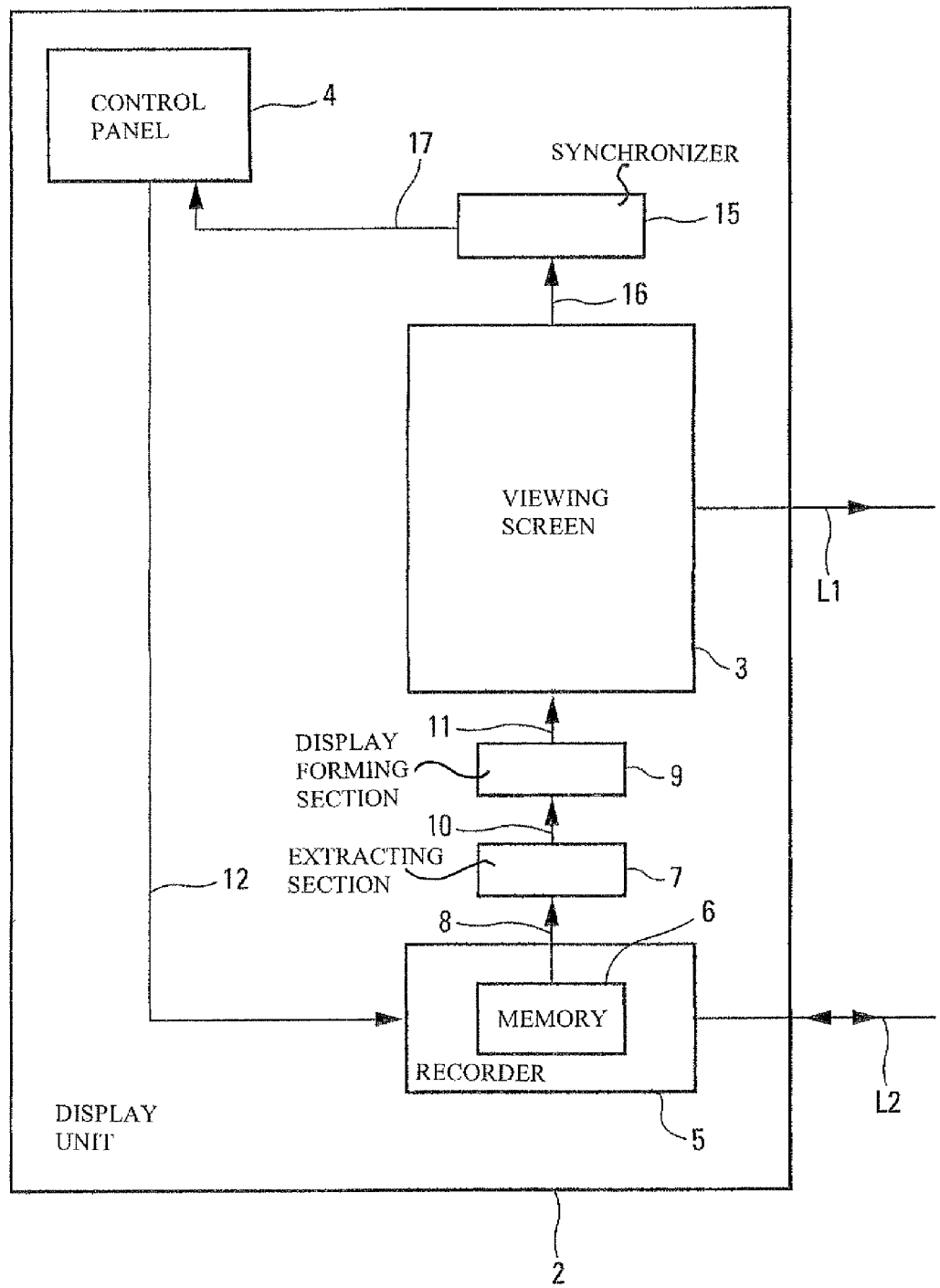
FIG. 1 shows schematically a (display) unit of a display system in accordance with the invention.
Figure 2:
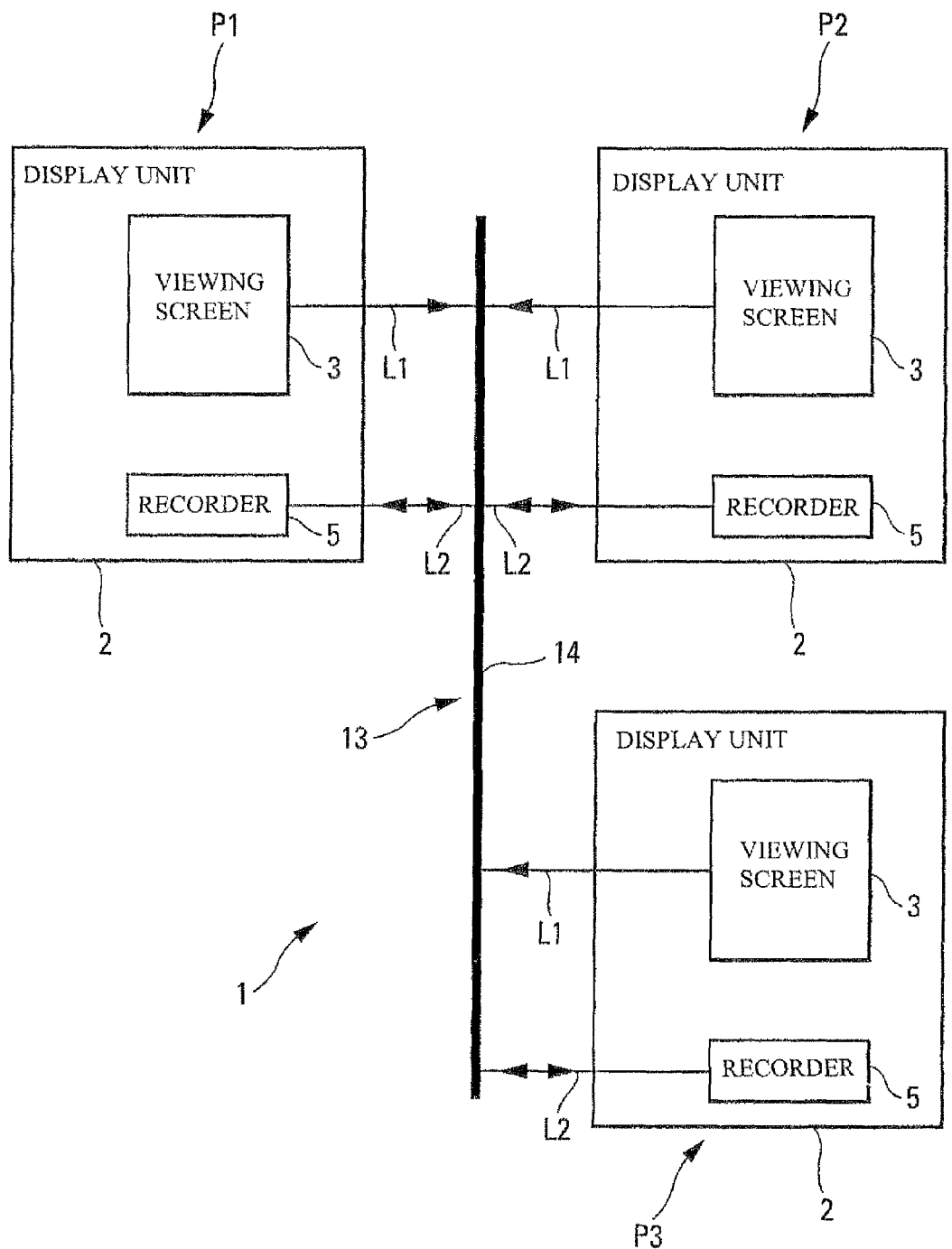
FIG. 2 is a schematic diagram of a particular embodiment of a display system in accordance with the invention.

The display system 1 in accordance with the invention and represented schematically according to a particular embodiment in FIG. 2 comprises a plurality of (display) units 2 such as that represented in FIG. 1. This display system 1 is mounted on an aircraft, in particular a military transport airplane, and is intended to display a plurality of items of information in the flight deck of the aircraft so as to aid the pilot to carry out the various missions envisaged.

Each of the units 2 of the display system 1 comprises in particular:
  a viewing screen 3 which is able to display one of a plurality of different formats, specified below; and
  a control panel 4 of DCP type, which is a standard electronic control panel, which is reconfigurable and which allows management of the display context of the viewing screen 3, to which it is dedicated. This control panel 4 comprises a plurality of actuation means (not represented), in particular rotary buttons and/or push buttons, which allow an operator, and in particular the pilot of the aircraft, to control the display on the associated viewing screen 3.

This control panel 4 allows the operator to choose a particular format to be displayed, as well as, for each particular format to be displayed, a particular display context (which represents a display configuration), according to which said format is presented. The display context defines a set of particular options (mode, scale, etc.) which can be selected by the operator, on the control panel 4 for the format which is displayed on the screen 3.

The present description includes various concepts which correspond to the following definitions within the framework of the invention:

a format (or display format) corresponds to a set of display data which belong to one and the same flight function. By way of example, the following may be cited:
  a primary flight data display, corresponding to short-term piloting: PFD format;
  a navigation data display, medium-term or long-term piloting: NTD format (or tactical navigation format);
  a data display allowing management of tactical systems: TM format;
a mode of display for a navigation format represents a particular organization of the display making it possible to view the navigation data. By way of example may be cited the following modes of display for a navigation format:
  ROSE mode: display centered on the position of the aircraft and presenting the navigation data (flight plan, tactical situation) over 360° around the position of the aircraft;
  ARC mode: display centered on the position of the aircraft and presenting the navigation data (flight plan, tactical situation) in front of the aircraft (over +/−35° with respect to the axis of the aircraft);
  PLAN mode: display centered on a point of the flight plan selected by the crew and presenting the navigation data (flight plan, tactical situation) over 360° around the selected point; and
  SLEW mode: display centered on a geographical point selected by the crew (via the navigation on a digital map) and presenting the navigation data (flight plan, tactical situation) over 360° around the selected point;
a display context depends on the (display) format concerned and defines a set of particular options which can be selected for the format concerned, such as the mode, the scale, the type of symbology requested, the type of interactivity selected, etc.;
a display configuration represents a given or particular display context, that is to say a situation for which the aforesaid options relating to the display context each present a particular possibility. By way of example, for a tactical navigation format of NTD type, the display context can comprise the following options: mode, scale, displayed symbology, as well as various other possible options. In this case, by way of illustration, it is possible to have the following two configurations:
  configuration C1: mode=ROSE, scale=40 Nm (nautical mile), displayed symbology=FMS, tactical=TCAS;
  configuration C2: mode=ARC, scale=80 Nm, displayed symbology=FMS.

The display system 1 in accordance with the invention comprises a plurality of units 2. Moreover, it exhibits a distributed architecture, that is to say an architecture where each unit 2 is independent of the other units, and which therefore does not comprise any data concentrator or master computer (or unit) which coordinates the action of the other units, as is the case in a centralized architecture. With a distributed architecture such as this, it is therefore not possible to provide a central facility for managing the display contexts.

According to the invention, in particular to reduce the workload of an operator, especially the pilot of the aircraft, upon a change of format which is displayed on one of the screens 3 of one of said units 2 of the display system 1, each of these units 2 comprises, in addition to the aforesaid standard elements 3 and 4, as is represented in FIG. 1:
  recording means 5 which are formed so as to automatically record display configurations in a standard memory 6 of said unit 2. More precisely, said recording means 5 record a display configuration for each of the various formats which are able to be displayed by the viewing screen 3 of the unit 2;
  means 7 which are connected by way of a link 8 to said memory 6 and which are formed so as to automatically extract from said memory 6 the display configuration which is associated with a particular format, when the display of this particular format is requested by an operator via the control panel 4 of the unit 2; and
  means 9 which are connected by way of links 10 and 11 respectively to said means 7 and to said screen 3 and which are formed so as to display on the screen 3 the new format requested by the operator, doing so in accordance with the associated display configuration which has been extracted from the memory 6 by the means 7.

Thus, by way of example, in the case where a particular format, for example a PFD format or a TM format such as aforesaid, is displayed on the screen 3 and where the pilot requests with the aid of the control panel 4 the display of a different format, for example an NTD format, if the memory 6 contains the aforesaid configuration C2 as display configuration associated with an NTD format, said means 9 will control the display of the NTD format on the screen 3 in accordance with said configuration C2, that is to say with:
  as mode, the ARC mode;
  as scale, a scale of 80 Nm; and
  as symbology, the FMS symbology.

According to the invention, in each unit 2 of the display system 1, said recording means 5 are therefore formed so as to record a display configuration in the memory 6 of the unit, for each of the formats able to be displayed by this unit. More precisely, said recording means 5 are formed so as to record in said memory 6, as display configurations:
  for the format which is currently displayed by this unit 2, the display configuration such as displayed; and
  for each of the other possible formats, the corresponding display configuration which has been displayed last for this format on all of the other units of the display system 1 and, in the event of impossibility, a default display configuration.

Accordingly, each unit 2 comprises a data transmission link 12 which connects the control panel 4 to the recording means 5 so that the latter can record the display configuration such as displayed. Moreover, according to the invention, said display system 1 comprises, moreover, a data transmission network 13 specified below, which interconnects the recording means 5 (and the viewing screens 3) of the various units 2 of the display system, as represented in a schematic manner in FIG. 2.

Within the framework of the present invention, the display system 1 is onboard the aircraft and it is intended for a single pilot of this aircraft. Such is in particular the case when the aircraft comprises only a single pilot. However, in the case where the aircraft is piloted by two different pilots, a controlling pilot and a copilot, said aircraft comprises a display set (not represented) which comprises two display systems 1 such as that aforesaid. One of these display systems 1 is then intended for the controlling pilot and is arranged on one side of the flight deck, and the other display system 1 is then intended for the copilot and is arranged on the other side of the flight deck, so that the associated viewing screens 3 are properly visible by these pilots.

In the example of FIG. 2, for each unit 2, only the viewing screen 3 and the recording means 5 have been represented so as not to overload the drawing and facilitate its understanding. Of course, in this example, each unit 2 comprises all the aforesaid elements in accordance with the invention, such as represented in FIG. 1. In the example of FIG. 2, the display system 1 comprises three units 2 which are arranged respectively at positions P1, P2 and P3 in the flight deck and which are, for example, intended for a pilot who is seated on the left side of the aircraft. In this example:

the position P1 can be an exterior position;
the position P2 can be an interior position; and
the position P3 can be a low position.

In this particular embodiment, the screen 3 and the recording means 5 of each unit 2 are connected respectively by way of links L1 and L2 to a network 14 which is, preferably, a standard avionics network of AFDX type. Said network 14 and said links L1 and L2 form the aforesaid data transmission network 13.

The display context synchronization function, implemented by the display system 1, conforms to various rules, specified below, and takes various assumptions into account.

In particular, said synchronization function takes into account the following assumptions:

for a display system 1 (such as represented in FIG. 2), that is to say on one side of a flight deck (for two pilots), each unit 2 receives display contexts of all the formats from the other two units 2, by way of the network 13; and
each unit 2 receives the changes of context of the current display format from its control panel 4 by way of the link 12.

The synchronization and storage function takes into account a rule relating to a continuous synchronization, according to which each unit 2 uses the following logic for each display format:

for the format that it displays, a unit 2, for example that situated at the position P1, takes into account only the changes of display context coming from its control panel 4 (for the displayed format) and ignores the display contexts coming from the other units 2 situated at the positions P2 and P3; and
for each of the other formats not displayed on the screen 3 of this unit 2 situated at the position P1:
if this format is displayed on another unit, for example on that situated at the position P2 or on that situated at the position P3, the unit 2 situated at the position P1 must store for this format the whole of the context coming from this other unit; and
if this format is not displayed on another unit, then its stored context must not change.

The above rule explained for the unit situated at the position P1 applies of course by analogy to those situated at the positions P2 and P3.

Thus, upon a change of format on a viewing screen 3 of one of the units 2 of the display system 1, the latter automatically presents this format in accordance with a prerecorded display configuration.

The display system 1 in accordance with the present invention therefore achieves a backup function (and display configuration restore function) which makes it possible to substantially decrease the workload of the crew, this being especially advantageous in particular during tactical operations for which the crew must remain concentrated on the flight and on the environment of the aircraft.

In a particular embodiment, when on a unit of said display system 1, the display is requested of a new format which corresponds to a format already displayed on another unit of said display system 1, this new display is not carried out.

However, in a variant of this particular embodiment, when on a unit of said display system 1, the display of a new format which corresponds to a format already displayed on another unit of said display system 1 is requested, for example twice, a swap of the display formats is carried out between these two units.

Additionally, each unit 2 comprises synchronization means 15 which are connected respectively by way of links 16 and 17 to said viewing screen 3 and to said control panel 4 and which are formed so as to automatically synchronize the control panel 4 with the display configuration, in accordance with which a new format is displayed on the viewing screen 3 so as to render the control panel 4 consistent with the display which is actually carried out on the viewing screen 3.

In a particular embodiment, the control panel 4 is connected to the other elements of the unit 3 (which form part of a unitary whole) by way of an A429 uplink and of an A429 downlink, which are illustrated respectively by way of the links 17 and 12.

Additionally, upon booting or rebooting the unit 2 situated at the position P1, this unit 2 carries out the following operations (with the aim of recording display configurations in the memory 6):

a) it tries to reacquire, if possible (that is to say if the configuration received is declared valid), from the unit 2 situated at the position P2, the whole set of display contexts for all the formats;
b) otherwise, it tries to reacquire, if possible (that is to say if the configuration received is declared valid), from the unit 2 situated at the position P3, the whole set of display contexts for all the formats; and
c) otherwise, it uses a default booting (or rebooting) configuration for all the formats.

In this example, a configuration dispatched by a first unit is considered to be valid for a second unit, if the communications are refreshed and if this first unit does not declare itself in the booting or rebooting phase.

Thus, in the event of a fault with the display system necessitating a reboot of the equipment, the reboot rule allows a reboot with the previously used configuration. A decrease in the workload of the crew, following a fault with the display system, is therefore obtained.

The invention claimed is:

1. A method for display-context synchronization for a display system of an aircraft, said display system exhibiting a distributed architecture and comprising a plurality of units, each of said units comprising: a viewing screen able to display one of a plurality of different formats, and a control panel comprising an actuator allowing an operator to control the display, on the viewing screen, of one of said formats so as to present it in accordance with a particular display context which represents a display configuration, said display context defining a set of particular options which have been selected for the associated format, the method comprising:

automatically recording, for each unit, a display configuration, in a memory of the unit, for each of the formats able to be displayed by the unit, wherein the following are recorded in the memory of the unit as the display configurations:
the display configuration as currently displayed for the format that is currently displayed by the unit; and
for each of the other possible formats, the corresponding display configuration that was displayed last for the format on all of the other units; and
a default display configuration;
automatically extracting, when the display of a new format is requested by an operator via the control panel on a particular unit, the recorded display configuration which is associated with the new requested format from the memory of the unit; and displaying the new format in accordance with the extracted display configuration.

2. The method as claimed in claim 1, wherein, when a new format is displayed in accordance with an associated display configuration on a unit, the control panel of this unit is synchronized with the associated display configuration of the displayed new format.

3. The method as claimed in claim 1, wherein said display system is intended for a single pilot of the aircraft, and wherein, when on a unit of said display system, the display is requested of a new format which corresponds to a format already displayed on another unit of said display system, this display of the new format is not carried out.

4. The method as claimed in claim 1, wherein said display system is intended for a single pilot of the aircraft, and wherein, when on a unit of said display system, the display is requested of a new format which corresponds to a format already displayed on another unit of said display system, a swap of the formats is carried out between these two units.

5. The method as claimed in claim 1, further comprising, upon booting of a unit:
recording as display configurations in the memory of the unit, if one of the other units of said display system is not in the booting phase and communications are refreshed, all the display configurations as recorded in the memory of this other unit; and
otherwise recording default display configurations as display configurations in the memory of the unit.

6. An aircraft display system with synchronized display context, said display system exhibiting a distributed architecture and comprising a plurality of units, each of said units comprising:
a viewing screen able to display one of a plurality of different formats;
a control panel comprising an actuator configured to enable an operator to control the display on the viewing screen of one of said formats so as to present it in accordance with a particular display context which represents a display configuration, said particular display context defining a set of particular options which have been selected for the one format;
a recorder that automatically records a display configuration in a memory of said unit, for each of the formats able to be displayed by this unit, said recorder being formed so as to record in said memory of the unit, as display configurations:
for the format which is currently displayed by this unit, the display configuration as displayed;
for each of the other possible formats, the corresponding display configuration which has been displayed last for this format on all of the other units; and
a default display configuration;
an extracting section that automatically extracts from said memory the display configuration which is associated with a new format, when the display of this new format is requested by an operator via the control panel of this unit;
a displaying section that displays this new format on the associated viewing screen in accordance with said extracted display configuration;
a data transmission link which connects said control panel at least to said recorder; and
a data transmission network which interconnects the recorders of the various units of said display system.

7. The display system as claimed in claim 6, wherein each of said units further comprises a synchronization section that automatically synchronizes the control panel of the corresponding unit, with a display configuration in accordance with which a new format is displayed.

8. An aircraft, which comprises the display system specified under claim 6.

* * * * *